Jan. 5, 1937. W. W. LASKER 2,066,406
TABULATING MACHINE
Filed June 16, 1931 9 Sheets-Sheet 4

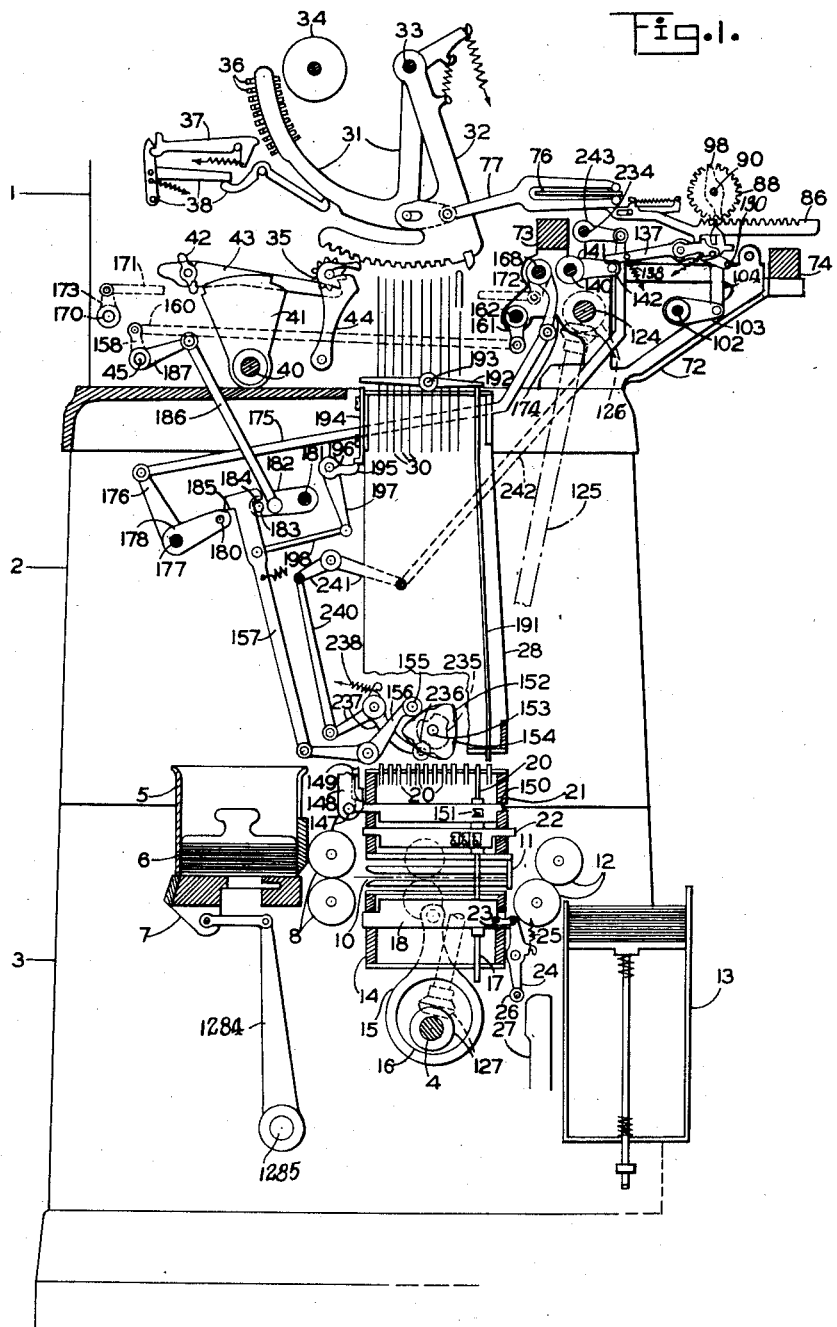

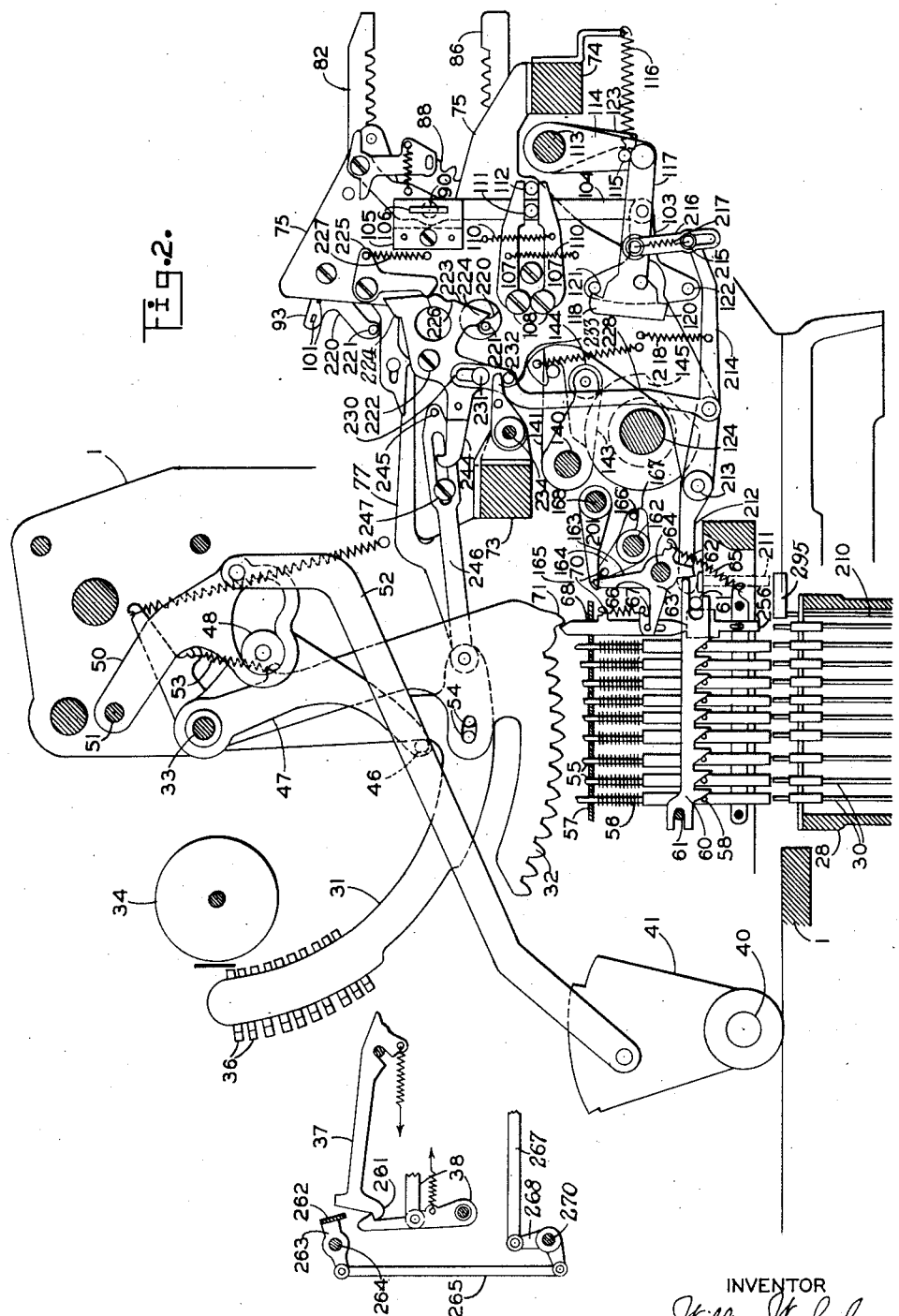

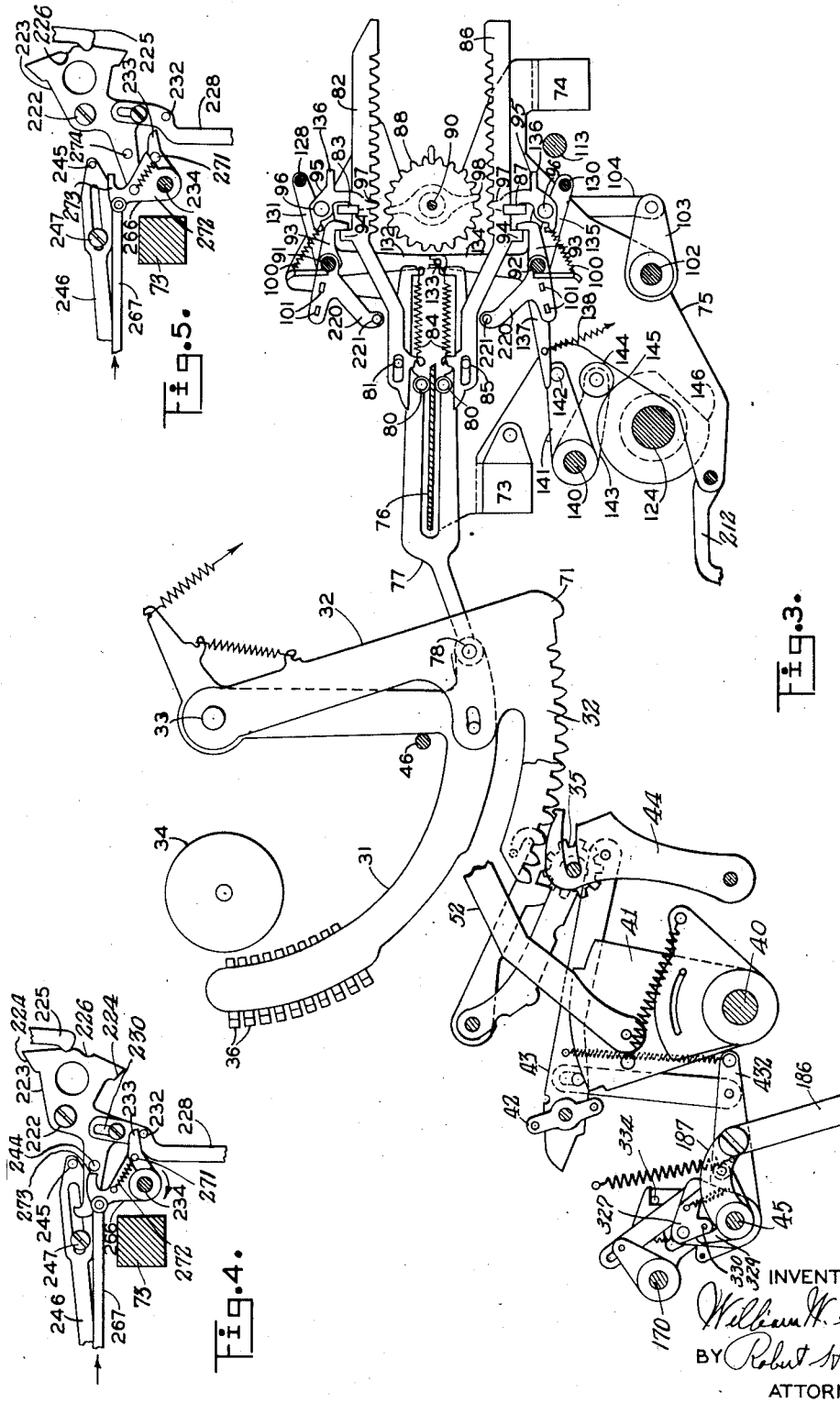

Figures 6, 7, 8, 9:
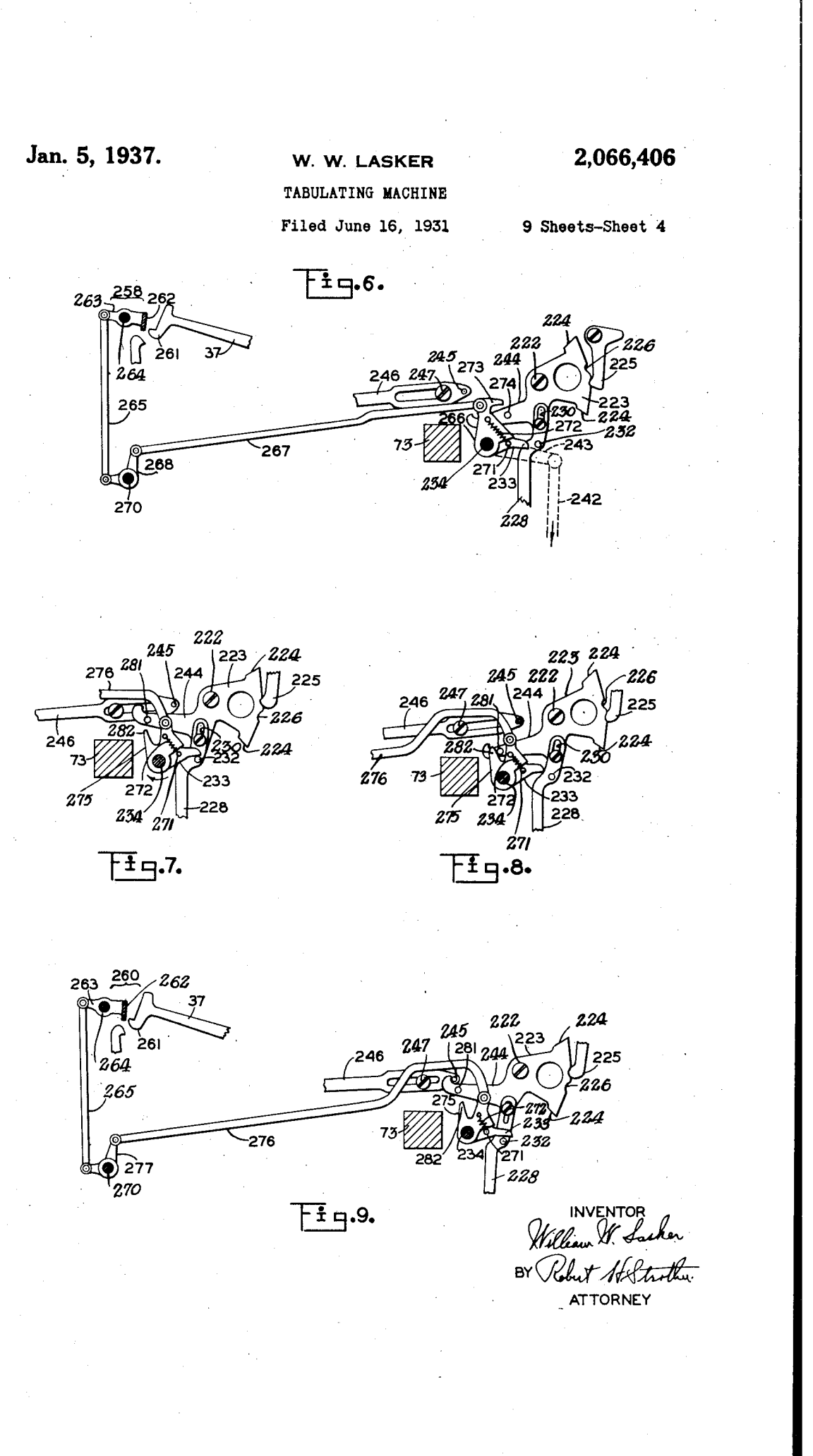

INVENTOR
William W. Lasker
BY Robert H. Strother
ATTORNEY

Jan. 5, 1937. W. W. LASKER 2,066,406
TABULATING MACHINE
Filed June 16, 1931 9 Sheets-Sheet 5

INVENTOR
William W. Lasker
BY Robert W. Strother
ATTORNEY

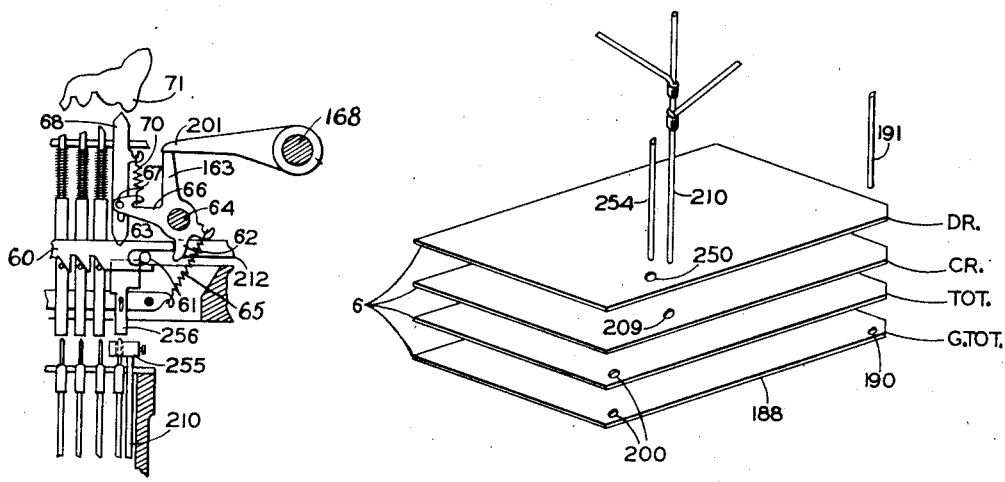

Jan. 5, 1937.   W. W. LASKER   2,066,406
TABULATING MACHINE
Filed June 16, 1931   9 Sheets-Sheet 7
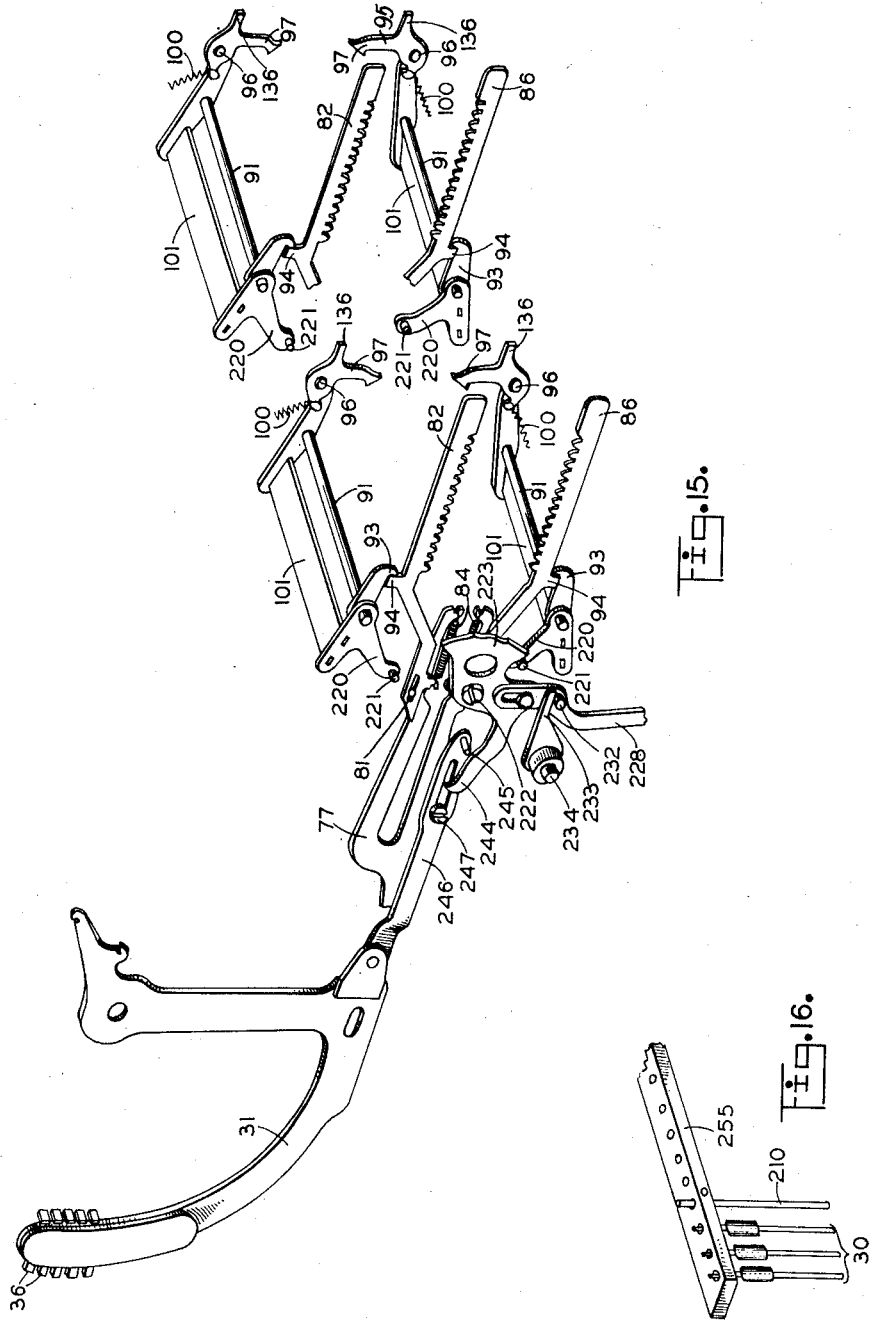
WITNESSES
INVENTOR
William W. Lasker
by
ATTORNEY

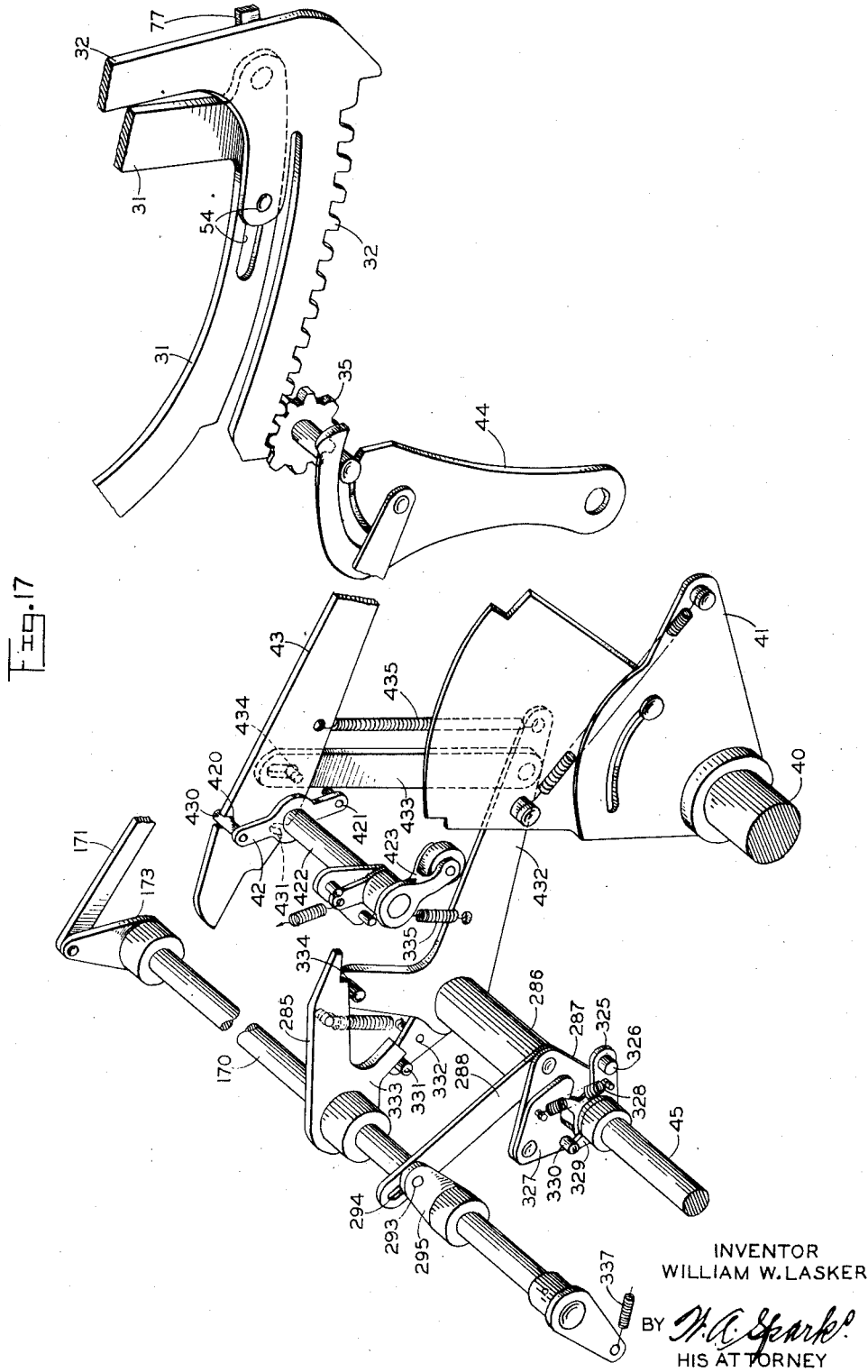

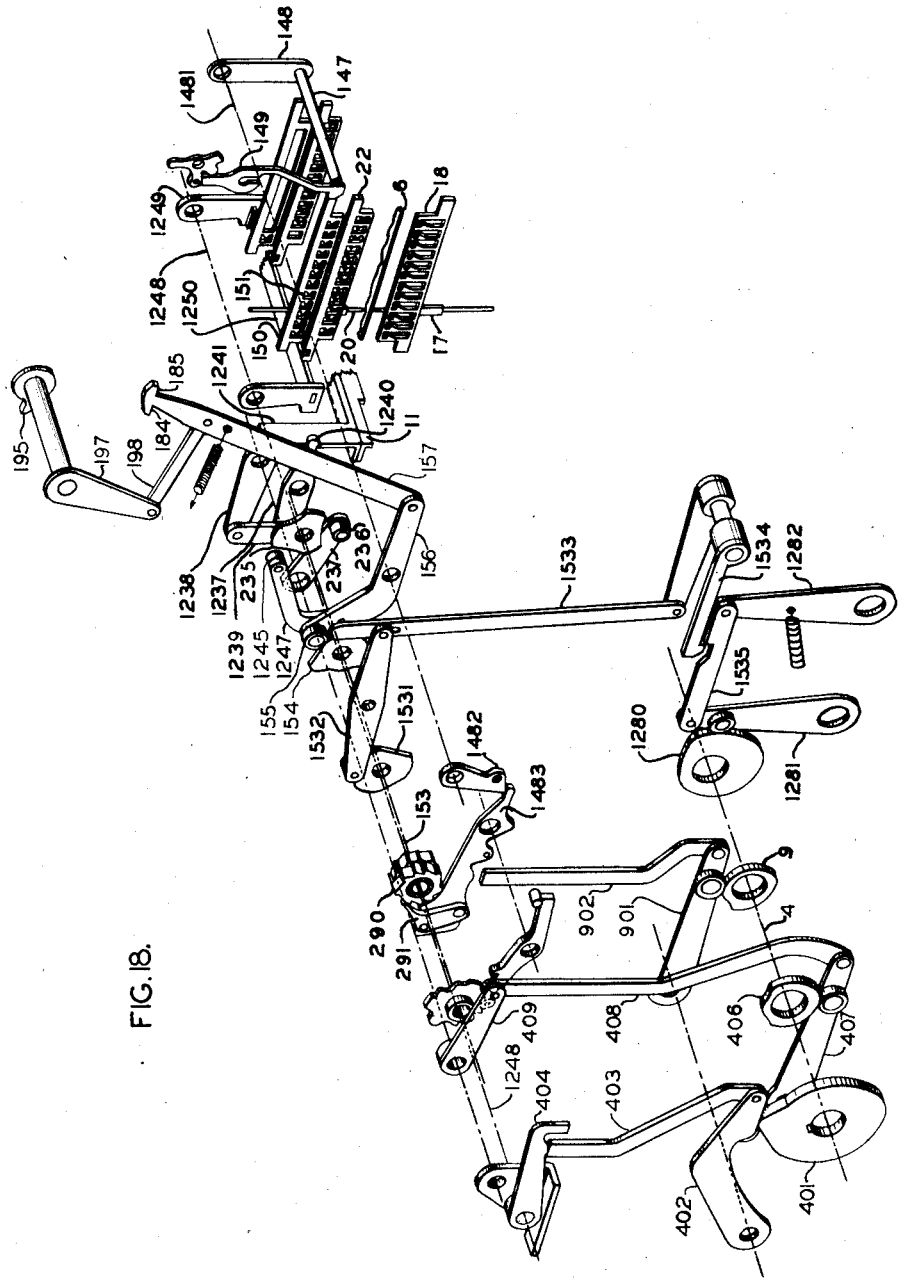

Patented Jan. 5, 1937

2,066,406

UNITED STATES PATENT OFFICE 2,066,406

TABULATING MACHINE

William W. Lasker, Brooklyn, N. Y., assignor to Remington Rand Inc., New York, N. Y., a corporation of Delaware Application June 16, 1931, Serial No. 544,720

13 Claims. (Cl 235—58)

The invention relates to tabulating machines controlled by perforated cards and particularly to novel improvements thereto, whereby the scope of the machine is broadened to include, with the other new and useful features, credit and debit balancing of financial accounts.

Prior to the development of the present invention, the use of tabulators using data perforated in cards was largely restricted to operations involving addition only. Hence, bookkeeping, as practiced in banking institutions, could not be completed without the aid of some sort of auxiliary. The usual method in such a problem as banking was, after indicating the records of the transactions on cards, to add the debit and credit items separately in a tabulator. Then on an adding machine, or on paper with a pencil, subtract the smaller from the larger, thereby determining the balance. Similar difficulties are existent in the problem of keeping inventory records on perforated cards. It is at once apparent that a need exists for improvements.

In the present invention means are provided, whereby the amounts of the transactions having an algebraically positive sign are accumulated in one computing unit, amounts having the opposite algebraic sign are accumulated in another, positive balances are computed in a third unit and negative balances in a fourth. In addition, means are provided to insure that printing of totals, whether positive or negative, occurs only in the column desired; that at the end of a group of cards the balance will be printed in the proper column according to whether that balance is positive or negative; that grand totals of the positive and negative items will be computed and printed, and that the final positive and/or negative balances will be computed and printed. Further, means are provided to distinguish between the positive and negative items, both of which are punched in the same field on the card and are identified by control perforations. Such a mechanism is suited either as herein described, or, as modified, to that wide variety of problems which involve increases and decreases, such as bank bookkeeping, running inventories, insurance accounting, and others.

The invention has for one of its objects to provide improved means for taking group totals and grand totals under the control of the cards.

Another object of the invention is to provide improved devices for actuating the mechanism for printing positive and negative totals, and debit and credit balances.

Another object is to provide improved means for computing and printing lists of debit and credit items with group totals of each together with the balance, that is to say the difference between the debit total and the credit total.

Another object is to provide means whereby debit balances will be printed automatically in one column and credit balances in another column on the paper.

The improvements to tabulating machines which are the object of this invention embody in combination mechanism controlled by cards and by change of designation mechanism for initiating total taking and total printing; mechanism for accumulating totals and grand total of both positive and negative items; mechanism for determining the differences between said positive and said negative totals; and mechanism for controlling the printing of said totals, grand totals and differences.

Other objects and structural details of the invention will be apparent from the following description when read in connection with the accompanying drawings, wherein:

Fig. 1 is a diagrammatic vertical section as viewed from the right and taken along an irregular line illustrating only the general organization of the machine.

Fig. 2 is a view similar to Fig. 1 on a larger scale, showing the head of the machine, the front accumulator mechanism being omitted.

Fig. 3 is a sectional view taken just inside its right-hand frame showing one of the adding and subtracting units and the connection to a printing sector and showing a front totalizer such as is used in a unit in which grand totals are taken.

Fig. 4 is a diagrammatic view showing elements in unit 6 in position for taking a negative total.

Fig. 5 is a view similar to Fig. 4 showing the same in position for taking a positive total.

Fig. 6 is a view similar to Fig. 4 showing the elements after actuation and the means by which printing is controlled.

Fig. 7 is a view of a setting identical to that of Fig. 4 except that the elements are those of unit 7.

Fig. 8 is a view of the elements of unit 7 set as described above for Fig. 5.

Fig. 9 shows the elements of Fig. 7 at the time the printing mechanism is released for operation.

Fig. 12 is a perspective view of a portion of the rear totalizer operating mechanism.

Fig. 13 is a schematic view illustrating the several types of cards used in the machine.

Fig. 14 is a fragmentary view showing means for retracting the zero stop.

Fig. 15 is a diagrammatic isometric view of mechanism for operating the controller.

Fig. 16 is a fragmentary diagrammatic isometric view of zero block out.

Fig. 17 is an isometric view of the mechanism for controlling the operation of the front totalizer with the elements in position for engagement of wheels and actuators.

Fig. 18 is an exploded isometric view of the automatic total control mechanism.

Figures 10, 11:
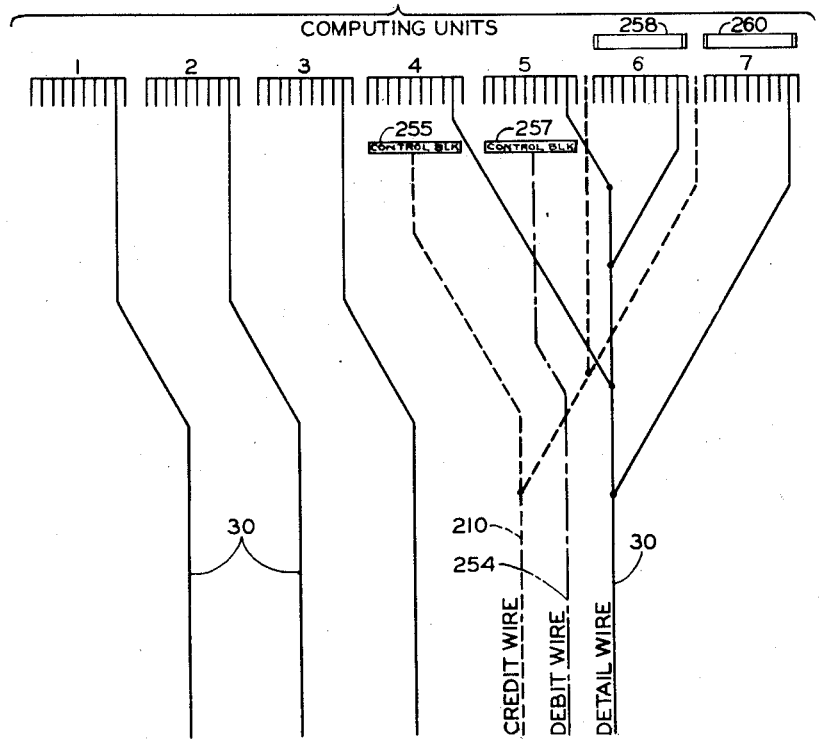
Fig. 10 shows a fragment of a printed record such as produced by the machine.
Fig. 11 is a schematic front view illustrating the system by which the various computing and printing units of the tabulator are controlled.

Throughout this specification the terms set forth below will be considered to possess the meanings there indicated.

Field is that portion of a card which lies between two lines, either real or imaginary, drawn parallel to the short edges of the card.

Zone is that portion of a card which lies between two lines, either real or imaginary, drawn parallel to the long edges of the card.

Algebraic totalizer is a totalizer which accomplishes the arithmetical operations of additions and subtraction. Throughout this specification the term shall be considered interchangeable with "adding and subtracting unit" and also "subtracting unit."

The invention is shown applied to one form of the well known Powers tabulator. The base of the machine and the connecting box or translator are shown in the drawings constructed substantially as shown in Patent No. 2,044,119, issued June 16, 1936, to William W. Lasker. The head of the machine illustrated is constructed substantially as shown in the application for patent of William W. Lasker and Charles Ruiz, filed May 8, 1931, Serial #535,842, and as fully described in the French patent to Accounting and Tabulating Machine Corporation, No. 719,524, granted Nov. 23, 1931, and Belgian patent to Accounting and Tabulating Machine Corporation, No 380,674 granted June 18, 1931. Except as hereinafter described the machine may be constructed as described in the two applications specified.

Machines embodying the mechanism described in above cited references are being regularly manufactured and are in public use in the United States and other countries.

The frame of the machine is usually built in three main parts, the frame of the head being indicated in Figs. 1 and 2 at 1, that of the connecting section at 2, and that of the base section at 3, said base section being mounted on a suitable leg structure.

The mechanism of the base comprises a main drive shaft 4 (Fig. 1), a magazine 5 from which cards 6 are fed by picker mechanism 7 to feed rolls 8 into a sensing chamber 10 where they are arrested by a card stop 11, and from which they are fed between feed rolls 12 into a receptacle 13. The sensing mechanism includes a pin box 14 reciprocated by pitmans 15 and eccentrics 16, the latter mounted on the drive shaft 4. This box contains feeling pins 17 (see also Fig. 18) which, in case they find a perforation in the card, become locked to a locking plate 18 so that they can press upward on set pins 20, which pins are mounted in a stationary pin box 21, and may be latched in their upper positions by latch plates 22.

A cam 401, mounted on shaft 4 operates to turn arm 402 counter-clockwise and thereby push member 403 upwardly to rock arm 404, shaft 1248 and bail 1250. This operation will cause latches 22 to release all locked pins 20 as is necessary when the number sensed in any column of the next card is zero. Card stop 11 is positioned by the action of cam 406 mounted on shaft 4, rocking arm 407 clockwise, thus pulling link 408 downwardly to rock arm 409, shaft 1237 and arm 1238 clockwise. This motion pulls link 1239 upwardly and rocks lever 1240 to lower card stop 11.

The locking plates 18 are controlled in their sliding movements by a rod 23 which is reciprocated front and rear by levers 24 and springs 25, one of said levers having a follower roller 26 controlled by a stationary cam 27.

The connection box, or multiple translator, 28 contains the interpreter wires 30 which are controlled from their lower ends by the pins 20. This box can be readily inserted in and removed from the machine so as to substitute different arrangements of translator wires.

The head of the machine contains a plurality of units, each including the usual type sectors 31 (Figs. 1, 2, 3, 15 and 17) and rack sectors 32 pivoted on a cross shaft 33, the type sectors cooperating with the usual platen 34, and the gear sectors with the usual accumulator pinions 35 except that in the specific arrangement illustrated the totalizers 35 are not required in two of the units and are, therefore, omitted. Cooperating with the types 36 are the usual hammers 37 controlled by the usual latch and hammer selecting mechanism 38 as shown in Patent No. 1,245,502, Fig. 17. The mechanism also includes the usual main rock shaft 40 having for each unit a cam sector 41 controlling a lever 42 which in turn controls the pitman 43 connected to the cam arms 44 which move the pinions 35 into and out of mesh with the gear sectors. The mechanism also includes the usual total shaft 45 which when rocked clockwise in Fig. 1 sets the machine for taking a group total.

As shown in Fig. 2 in each unit the type sectors 31 are controlled by the usual bail rod 46 mounted on arms 47, one of which carries a follower roller 48 running in a cam slot in an arm 50 pivoted at 51 and connected by a link 52 with the sector 41; and each type sector is connected with its gear sector 32 by the usual spring 53 and pin and slot connection 54.

In each unit there is a stop basket containing a series of digit stops, or pins, 55 (Fig. 2) each normally held down by its own weight and by a spring 56, and slidably mounted in a frame 57. Each of these stop pins is adapted to be pushed upward by one of the translator wires 30. Each pin 55 has a stud or pin 58 projecting therefrom and adapted to act on the inclined edge of a tooth of a slide bar 60 which is guided on rods 61, and which at its rear end engages an arm 62 of a multi-armed lever 63. There is a series of these levers, one for each denominational order, and all pivoted on a rod 64, and each controlled by a spring 65. Each lever has an arm 66 having a stud 67 playing in a vertical slot (for a purpose to be described hereinafter) in a zero stop 68 to which the arm 66 is connected by a spring 70. The construction is such that the zero stop is normally held in its upper position by the spring 65, but whenever any stop pin 55 is moved upward the bar 60 sliding rearward will rock the lever 63 and pull the zero stop down out of the path of the lug 71 on the sector 32.

In the particular embodiment of the invention chosen for illustration the machine is equipped with the seven computing units usually in the Powers tabulator, this being indicated diagrammatically in Fig. 11 where the units are numbered 1, 2, 3, 4, 5, 6, and 7 respectively. Unit 4 is used for accumulating and printing debit items, totals and grand totals; unit 5 for accumulating and printing credit items, totals and grand totals; unit 6 is utilized for computing and printing debit balances, and unit 7 for computing and printing credit balances, all as indicated in Fig. 10. Units 6 and 7 are, therefore, equipped with the algebraic totalizers, hereinafter called adding and subtracting units, disclosed in French Patent 719,524, and Belgian Patent 380,674 hereinbefore referred to and hereinafter described. Units 4 and 5 are equipped with a modified form of totalizer or accumulator whereby each of these units can accumulate and print both group totals and grand totals.

Algebraic units

End brackets 72, Figs. 1 and 12, are secured to the frame 1 and they carry heavy cross frame bars 73 and 74 which support the subtraction mechanism as well as another accumulator mechanism to be hereinafter described. Each subtraction unit or adding and subtracting unit comprises a frame work including side plates 75, Figs. 2 and 3, each secured to the bars 73 and 74, said side plates connected to each other by suitable frame pieces one of which consists of a plate 76, Fig. 3, which is embraced by the upper and lower branches of a series of forked links 77 each pivoted at 78 to the sector 31 which lies in front of it. Each of the forks of the links 77 has a pair of rollers 80 running on the frame plate 76 which plate, therefore, guides the rear end of the link. The upper branch of the link 77 is connected by a pin and slot connection 81 to a subtraction rack 82 which is guided in a comb bar 83. This rack is also connected with the link 77 by a spring 84 for the purposes of transfer.

The lower branch of each link 77 has pin and slot connection 85 with an adding rack 86 which is guided in a frame comb bar 87 and is connected with the link 77 by a spring 84. The rack 82 faces downward and the rack 86 upward, and between them the accumulator pinions 88 are journaled on a shaft 90, which shaft and the pinions 88 are movable up and down to three positions, namely, a neutral position shown in Fig. 3, a lower or adding position in engagement with racks 86, and an upper or subtracting position in engagement with the racks 82. The comb bars 83 and 87 provide additional cross ties between the side plates 75.

Transfer mechanism

The transfer mechanism (Figs. 2 and 3) comprises an upper shaft 91 (see also Fig. 15) and a lower shaft 92 on which are pivoted pawls 93 each normally in position to engage a lug 94 on the rack 82 or 86. Each of these pawls has a latch pawl 95 pivoted thereto at 96 and at its free end engaging under the bar 83 or over the bar 87, and each such latch pawl including a tooth 97 which when the accumulator pinions are in mesh are in the path of transfer teeth 98 on the pinions 88. Springs 100 control both the latch pawls 95 and also the transfer pawls 93. The construction is such that whenever a register wheel passes the transfer point the latch 95 will be tripped and the spring 100 will draw the pawl 93 out of the path of the lug 94 and permit to the rack 82 or 86 an additional step of movement.

The pawls 93 shown in the drawings are modified pawls for the purpose of algebraic computation. In Fig. 15 the pawl 93, shown in each instance, is the one cooperating with the rack of lowest order. It is connected by a bail bar 101 with an arm at the opposite side of the unit, which arm carries the latch 95 controlled by the register wheel of highest order, the construction being such that whenever the total changes from plus to minus the upper pawl 93 will be operated to cause the transfer mechanism to subtract one from the wheel of lowest order; and whenever the total changes from minus to plus the lower latch 95 will be tripped by the wheel of highest order and will cause the lower pawl 93 to add one to the wheel of lowest order by means of the transfer mechanism.

The transfer and algebraic mechanism just above described is substantially like that which has been in use in the well known Sundstrand machine for a number of years, and it is described in the French patent of Sundstrand No. 625,678. For the purposes of the present invention said mechanism may be of any suitable construction.

Polarity control

The means for moving the shaft 90 and the accumulator pinions 88 up and down to their three positions is illustrated in Figs. 2 and 12. In each unit a rock shaft 102 is journaled at its ends in the side plates 75 and at each end it has fast thereon a T-shaped lever 103 to which is pivoted the lower end of a link 104 through the upper end of which the shaft 90 projects so that said shaft 90 can be moved up and down at its two ends by rocking the shaft 102 and its arms 103. The upper part of the link 104 is guided partly by the shaft 90 and partly by a bracket 105 (Fig. 2) secured to the side plate 75, and having in it a slot 106 through which the shaft 90 projects, the upper and lower ends of the slot limiting the upward and downward motion of the shaft. The parts are centered to hold the shaft 90 in its neutral position by means comprising a pair of lever arms 107 pivoted to the plate 75 at 108 and drawn each toward the other by springs 110. The lever arms 107 embrace between them a stud 111 on the link 104 and a fixed stud 112 on the frame plate 75. When the parts are free to move, the springs 110 pinch the two lever arms together on the fixed stud 112 and thus resiliently hold the stud 111 in its middle position from which it can be moved in either direction against the tension of one of the springs 110.

Addition and subtraction mechanism

A rock shaft 113 (Figs. 2 and 12) has loosely mounted thereon, for each subtracting unit, an arm 114 having a stud 115 to which is connected a strong tension spring 116 tending to pull the arm 114 rearwardly. To the free end of this arm is pivoted a T-shaped link 117 having on its forward end an upper hook 118 and a lower hook 120. One of the arms 103 on the rock shaft 102 is made T shaped and it has an upper stud 121 adapted to be operated by the hook 118 and a lower stud 122 adapted to be operated by the hook 120. With the parts standing in the position shown in Fig. 2 in which the hook 118 registers with the stud 121, if the spring 116 is free to act it will draw the link 117 rearwardly, rock shaft 102 clockwise and pull the register pinions into engagement with the racks 86 and thus set the machine for addition. If on the other hand link 117 be swung to its lower position in which the hook 120 registers with the stud 122, and if then the spring 116 be freed to act it will rock the shaft 102 counterclockwise and set the mechanism for subtraction.

The arms 114 are controlled each by an arm 123 fast on the shaft 113 and contacting with the rear side of the stud 115, and it is the arm 123 which, in Fig. 2, is holding the arm 114 forward against the tension of the spring 116 and thus maintaining the register wheels in their neutral position. It will be perceived that when the shaft 113 and arms 123 stand in the position shown in Fig. 2 the register wheels will be in neutral position and that they can be thrown into mesh with the racks by rocking shaft 113 counterclockwise, this resulting in setting the machine in position for addition or subtraction depending on the position of the link 117 at the time. Mechanism for rocking shaft 113 is described in the cited French Patent 719,524 and Belgian Patent 380,674, and is illustrated in Figs. 1 and 12 hereof. The mechanism comprises main shaft 4, bevel gears 126 and 127, shafts 124 and 125, cam 300, bell cranks 305 and 306, arm 313, link 316, pin 317 and spring 318, the construction and operation of which is as follows:—Mounted on main shaft 4 is one of a pair of bevel meshed gears 127, the other being mounted on the lower end of shaft 125. Fixed to the upper end of shaft 125 is one of a pair of meshed bevel gears 126, its companion being fixed on shaft 124. The ratios of these bevel gears is 1 to 1. Hence, a rotation of main shaft 4 causes the rotation of shaft 124.

Total control

The cam mechanism referred to is shown in Fig. 12. Outside the right-hand frame member or bracket 72, the shaft 124 has mounted thereon a cam disc 300 the periphery of which comprises a low concentric dwell portion 301, and a high concentric dwell portion 302, these dwells being connected by two inclines 303 and 304. This cam controls two follower bell cranks, one of which is a mirror reverse of the other, namely, a lower bell crank 305 and an upper bell crank 306 carrying respectively follower rollers 307 and 308, the horizontal arms of the bell cranks being connected by a tension spring 310. The vertical arms of the two bell cranks approach each other at their ends, each comprising a concentric shoulder 311 and a projecting tooth or lug, 312. Fast on the outer end of the shaft 113 is a bell crank formed with a downwardly extending arm 313 and an inclined forwardly extending arm 314. To the arm 313 is pivoted a link 316 which near its forward end has a stud 317 which lies between the shoulders 311 and in the path of one of the teeth 312. A spring 318 tends to swing the link 316 upward against the shoulder 311 of the upper bell crank 306 but the link is normally held in its lower position by an arm 320 fast on the end of the group total rock shaft 162 which arm, at its rear end, overlies a stud 321 projecting from the link 316. The construction is such that in ordinary operations the link 316 is operated by the lower bell crank 305, but when the shaft 162 is rocked to set the machine for taking a group total the arm 320 permits the spring 318 to swing link 316 upward to a position where it will be controlled by the upper bell crank 306. The construction of the cam 300 is such that in an ordinary listing operation in the first part of the cycle the follower roller 307 will be depressed, the link 316 and arm 313 will be drawn forward and the shaft 113 will be rocked clockwise. When this occurs the arms 123 will force the arms 114 and links 117 forward and permit the centering device shown in Fig. 2 to draw the register wheels to neutral position. The roller 307 runs off of the high part 302 of the cam at about the end of the first half of the cycle allowing the springs 116 to cause the links 117 to pull the accumulator wheels into engagement with the lower racks in case the machine is set for addition and with the upper racks in case the machine is set for subtraction.

In a total taking operation the stud 317 stands in front of the tooth 312 of the upper bell crank 306. The follower 308 of this bell crank rides on the low part 301 of the cam during the first half of the cycle with the result that the accumulator wheels continue in mesh during that half of the cycle. At the end of the first half of the cycle the incline 303 of the cam raises the roller 308 and pulls forward the link 316 withdrawing the wheels from mesh.

As described in the French Patent 719,524 and Belgian Patent 380,674 above referred to, the rock shaft 40 may advantageously be rocked by a crank on shaft 124, said crank operating a pitman connected with an arm projecting upward from the shaft 40 (Figs. 1 and 3).

Transfer restoring

As described in said French Patent 719,524, and Belgian Patent 380,674, and illustrated in Figs. 1 and 3 hereof, the transfer mechanism is, at the proper time, restored to its normal position by means of a transfer resetting mechanism consisting of an upper bail rod 128 and a lower bail rod 130. The upper bail rod is mounted between two arms 131, one of which forms a bell crank with arm 132. Arms 134 and 135 form a second bell crank, the arm 135 of which supports one end of the lower bail rod 130. The arms 132 and 134 are connected by a pin and slot device 133 and hence rock the two bails in unison, the upper rod 128 moving downward and the lower rod 130 upward into contact with ears 136 of the latches 95, thus restoring both the upper and the lower transfer mechanism to normal.

Improved means are shown in the present instance for operating this restoring transfer mechanism. The lever 134, 135 (Fig. 3) has a forwardly directed arm 137 which is drawn downward by a spring 138. The power of this spring restores the transfer mechanism of a particular unit to its initial position instead of the restoring mechanism being operated positively as it was in the cited reference. A rock shaft 140 is mounted in the brackets 72 and at each unit where such an operation is required this rock shaft has fixed thereto an arm 141 having a stud 142 projecting therefrom just beneath the arm 137. This rock shaft also has an operating arm 143 carrying a follower roller 144 which is pressed by the spring or springs 138 against a cam disc 145, fast on the shaft 124. This disc is concentric for the greater part of its periphery so as to hold up the arms 143, 141 and 137 and thus retain the bars 128 and 130 in their inactive positions, shown in Fig. 3. At the proper place in its periphery this cam has a flattened face 146 which permits the roller 144 to move downward momentarily and allows the springs 138 to restore the transfer mechanism. This arrangement is better than a positive operation of the restoring mechanism for in the former structure breakage might occur if the parts became disarranged.

Group totaling

In order to take both group and grand totals, units 4 and 5 are each provided with a rear totalizer, as shown in Fig. 1, in addition to the ordinary forward totalizers 35. Since subtraction is not required in these two units, the adding and subtracting mechanism is modified as follows: The units have substantially the same framing as algebraic totalizers, including the plate 76 and the links 77 which are connected up and guided in the same way as in the subtraction units. The upper or subtracting racks 82 and the cooperating transfer mechanism are omitted but the lower racks 86 are retained. The register pinions 88 are never moved upward from neutral position but are, on occasion, moved downward into engagement with the racks 86 in precisely the same way as in the subtraction units. The transfer resetting bar 130 is provided and mounted on the arms 135, one of which has the forwardly projecting arm 137 controlled by a spring 138 and by a stud 142 and arm 141 the same as in the case of the subtraction units. The attachment of link 77 to sector 32 at 78 causes rack 86 and sector 32 to work as an entity, the rack 86 moving forward with the sector 32 and returning when the sector 32 returns. Thus, items are accumulated on the wheels 88 and when the group totals are printed they are transferred to the forward accumulators 35 which, therefore, preserve a grand total of the debits and credits.

Grand totals

The Powers machines have heretofore, on occasion, had any desired unit equipped with a rear accumulator 88 in about the position of the said accumulator described in the preceding paragraph. In those machines each item was added on the forward accumulator 35 and on the rear accumulator which latter was utilized for grand totals. When group totals were taken the grand total accumulator was disabled so that it was not cleared, and means were provided whereby the forward accumulator could be disabled and the grand total printed from the rear accumulator. In the present embodiment the rear accumulators 88 of units 4 and 5 are assigned to group totaling and the corresponding forward accumulators 35 are assigned to grand total. This form of construction is more convenient since it avoids complications in the assembly of the machine. The advantage is readily seen when it is understood that the rear accumulators are positioned by the action of shaft 124 (Fig. 1) and the forward accumulators by the action of shaft 40.

The total taking mechanism of the present machine is essentially a combination of that of the mechanisms for that purpose described in the French Patent 719,524, and Belgian Patent 380,674, and in the Patent No. 2,044,119 hereinbefore referred to, with certain modifications which will be described briefly hereinafter.

Initiation of total taking

The machine described in the Lasker Patent No. 2,044,119 is provided with means for initiating and controlling the taking of totals either by a suitably perforated total card, or automatically on a change of designation, as desired. That machine includes, among other things, a bail bar 147, Figs. 1 and 18, supported by arms 148 depending from a transverse rock shaft 1481. In the pin box 21 above the latch slides 22 there are mounted other slides 150, each of which is made with a series of upright slots 151 and into each of those slots a stud projects from one of the pins 20. The forward edge of each of the slots 151 is made with an inwardly projecting nose or tooth with inclined sides so that when one of the pins 20 is moved either up or down it will cause the slide to be moved toward the front of the machine. In each of the first 44 columns there is provided a hand controlled interponent 149. These interponents normally occupy an elevated position, but any one of them can be moved downward to a position between the bail bar 147 and the forward end of the slide 150 (Fig. 18) so that whenever that slide is moved by the setting of a new pin 20 in that particular column a momentary forward swinging motion will be given to the bail 147 which motion initiates the total taking operation by the means to be described under the next heading.

In the 45th row only the 12th pin 20 is provided with a stud that controls the slide 150 and the forward end of that particular slide is prolonged so that it, itself, is adapted to operate the bail 147 without the intervention of any interponent 149. A hole in the 12th position of the 45th column of a card will, therefore, initiate a total taking operation. There are, therefore, two methods of taking totals both of which may be retained in the present machine.

Total taking mechanism

The total taking mechanism includes a total shaft 153 (Figs. 1 and 18) mounted on the frame work to the left of the translator box 28. This shaft is normally quiescent in the position shown in Fig. 1. It bears a nine toothed ratchet wheel 290 by which it can be rotated, one tooth very early in each cycle of operation, by means of a cam 9 mounted on the shaft 4 elevating arm 901 and rod 902. The drive pawl 291 is normally latched out of operation and the latch 1482 is released by the rocking of the bail 147, 148 and shaft 1481 to which latch 1482 is rigidly attached. The shaft 153 carries a series of cams having nine points arranged in three series of three points each. In the normal position of the shaft these cams set the mechanism for the tabulation of items. When the pawl is tripped and the shaft is given its first step of motion it sets the mechanism for a spacing cycle. At the beginning of the next cycle the pawl is again operated and the cams on the shaft 153 then set the mechanism for the total taking cycle. At the beginning of the third cycle the pawl again turns the shaft and sets it for a normal tabulating operation, whereupon the latch 1482 is again interposed above the nose of the pawl supporting lever 1483 and thus holds the drive pawl out of cooperative relation with rod 902 until latch 1482 is again tripped by the bail bar 147.

A cam 1531 (Fig. 18) on shaft 153 cooperates with a roller on lever 1532 to raise and lower link 1533 and thereby rock the latch 1534 into and out of engagement with notch in the top edge of link 1535. If then link 1535 is restrained by latch 1534, the picker arm 1280 on shaft 4 is rendered ineffective with respect to the picker actuating mechanism, which is comprised of arms 1281 and 1282, shaft 1283, and arm 1284 (see also Fig. 1) and the card picker 7 is disabled during spacing and totaling cycles, so that no fresh cards are fed into the sensing mechanism.

A cam 235 acts to retain the card stop 11 in card arresting position, so that the first card of the new group is retained until the third or tabulating cycle. This is necessary when totals are instigated by change of designation. The associated mechanism comprises arm 237, roller 236, shaft 1237, arm 1238, link 1239, lever 1240 and support bar 1241. Roller 236 is retained in cooperative relation with cam 235 by a spring (not shown). Rotation of cam 235, when shaft 153 upon which it is mounted is actuated, would cause roller 236 to be positioned on a high dwell of the cam, thereby rocking shaft 1237, and arm 1238 clockwise, thus elevating link 1239 and rocking lever 1240 clockwise. Whereupon support bar 1241 is depressed and card stop 11 is positioned to block the passing of a card.

Cam 235 serves also to actuate the mechanism, which during totaling, retracts the slides 22 so that when totals are instigated by a change of designation, the data, which is perforated in the record card then in the sensing chamber is not carried to the digit stops, for to do so would confuse the printed record. This mechanism comprises a roller 1245, spring 1246, arm 1247, shaft 1248, arms 1249 and bail 1250.

When cam 235 is actuated, roller 1245, which is retained in cooperative relation with the cam by spring 1246, rides up on a high dwell and thereby rocks arm 1247, shaft 1248 and arms 1249 counterclockwise. Bail 1250, which is supported between the arms 1249, is thereby forced against the extending ends of slides 22, and the latter are moved against the pressure of their respective springs to pin-releasing position. Hence, pins 20 are free to descend and thus fail to record the reading of the card then in the sensing chamber, as is necessary when totals are instigated by a change of designation.

The third one of the cams on the shaft 153 is shown in Figs. 1 and 18 at 154. This is a disc controlling a follower roller 155 mounted on a lever 156 which operates a link 157. In the Patent No. 2,044,119 this link goes directly to an arm on the total shaft 45 so as to set the mechanism for taking a total in the usual way. In the present embodiment this link has been modified as will be hereinafter described. The roller 155 normally rests on a low part of the cam 152 as shown. When the shaft is given its first turning movement for a spacing cycle this roller will still be on a low part of the cam. The second actuation of the cam, however, brings a high part of the cam under the roller and rocks lever 156 and sets the machine for a total taking cycle. At the beginning of the next cycle, the shaft again turns and the follower 155 runs down on to a low part of the cam restoring the total taking mechanism to normal position.

In the machine of the French Patent 719,524, and Belgian 380,674 the total shaft 45 has on its left-hand end an upstanding arm 158 which is connected by a link 160 with an arm 161 depending from and fast on a transverse rock shaft 162 at the rear of the machine, and this mechanism is retained in the present case but the mechanism operated by the shaft 162 has been modified, though it performs substantially the same function as before, namely, that of releasing the zero stops 68 to allow the sectors to swing forward for total taking purposes.

Each of the levers 63, which levers control the zero stops 68, is made with an upright arm 163 (Figs. 2 and 14). Just back of each unit there is loosely mounted on the shaft 162 a bail consisting of two arms 164 and a bail bar 165, the latter lying just behind the arms 163 in such a position that when the bail is rocked counterclockwise it will rock all of the levers 63 of that unit and pull down all of the zero stops 68. One of the arms 164 of each bail is prolonged rearwardly and provided with a stud 166 which stands just above an arm 167 projecting from and fast on the shaft 162. The construction is such that when this shaft is rocked by the motion communicated to it from the shaft 45 all of the zero stops 68 will be pulled down unless prevented by zero blockout devices to be hereinafter described.

In the ordinary units of the machine, which in the present set-up are units 1, 2, and 3, the shaft 45 modifies the action of the devices 42, 43 etc. so as to take a total from the accumulators 35 in the usual way. The timing of the regular Powers totalizers is given in detail in the cited Powers Patent 1,245,502. That timing is utilized herein without change for all computing units which do not have associated algebraic units.

The totalizer wheels 35 are mounted on a shaft which is raised or lowered by a camming hook arm (or rocker cam) 44 (Figs. 1, 3, and 17). Pivotally attached to this hook is a pitman 43 having two notches 430 and 431, the first on its upper edge and the second on its lower edge.

When an adding operation is performed, the notch 430 engages upper pin 420 of the rocker arm 42 which is rigid with a shaft 422 on which is loosely mounted a downwardly extending spring-centralized roller-carrying arm 423, (see Fig. 17) having a limited free movement determined by a pin plate rigid with said shaft 422. Fan cam 41 oscillates with every operation of the machine. In the initial part of the first half cycle, the forward notch thereof rocks the arm 423 thereby oscillating the shaft 422 and rocker arm 42; thus shifting the pitman 43 rearwardly to cam the wheels 35 out of mesh with actuating racks 32. The shaft 422 will be rocked in the opposite sense during the initial part of the return movement of sector 41, to engage the wheels 35 by shifting pitman 43 in the corresponding opposite direction with the actuators 32 in positions which they have assumed under control of the record card.

When a total taking operation is performed, the described engagements between pitman 43 and rocker arm 44 are inverted, but since the wheels 35 are normally in mesh with actuators 32 they should remain in mesh during the first half cycle of operation. This is effected by withdrawing notch 430 from engagement with pin 420. Notch 431 is so located that it does not lie immediately above the pin 421 of the rocker arm 42 when said rocker arm is in normal position, but is in a position to engage said pin when the rocker arm has been shifted during the movement of sector 41. This requires a flexible connection in the train of mechanism for pulling pitman 43 down. In the normal operation of the Powers machine, the mechanism is set for taking totals by drawing the link 186 (Fig. 3) downwardly thus rocking arm 187 which is fast to shaft 45 to which is also fast an arm 432 (Fig. 17). Near the rearward end of said arm is a link 433 having a pin and slot connection 434 with the pitman 43. The aforesaid flexible connection is the spring 435 extending between the rearward end of arm 432 and the pitman 43. Therefore, when shaft 422 has been oscillated after shaft 45 has been rocked, the spring 435 is tensioned until the shaft 422 is rocked sufficiently to bring pin 421 beneath the notch 431; then spring 435 effects a positive engagement of the pitman 43 with the lower pin 421. When the sector 41 starts its return movement at the initial part of the second half-cycle of operation, shaft 422 is oscillated to shift the pitman 43 rearwardly and thus disengage the wheels 35 which have been turned to their zero positions during the forward stroke of the actuators 32 during the first half-cycle of the machine operation.

It is thus seen that during adding operations, the wheels 35 are disengaged during the first half-cycle of operation or forward excursion of the actuators and engaged during the second half-cycle or return movement of the actuators and during total taking the order of engagement of the wheels with the actuators is exactly the inverse of that for adding operations.

In the case of units 4 and 5 the action of this shaft is modified in such a manner by the means fully described in the French Patent 719,524, and Belgian Patent 380,674 that in those units, therefore, the forward accumulators 35 are inactive during listing operations but are controlled for an adding operation when totals are taken from the rear totalizer so that said totals are added into or transferred to the forward accumulators 35, which thus serve as grand totalizers for these units.

It is readily seen from the above that the timing of front totalizers 4 and 5, since they have algebraic totalizers associated therewith, is different from that of the other front totalizers. The timing mechanism is therefore modified to accomplish this.

The modified mechanism includes a latch 285 (see Figs. 3 and 17) loosely mounted on shaft 170 and adapted to hold arm 432 in a mid position so that neither pin 420 nor pin 421 will operate the pitman 43 (this position of the arm and pitman is clearly shown in Fig. 3). Arm 432 is fast to a sleeve 286, which is loosely mounted on shaft 45, instead of being fixed to the shaft as in the usual Powers construction described briefly hereinbefore. Also fixed to the sleeve 286 is a gusset plate 287 having pivoted thereto a link 288 having a pin and slot connection 293 and 294 with the arm 295 fast on shaft 170. Mounted loosely on shaft 45 and adjacent to gusset plate 287 is a bell crank 325, which carries a pin 326 adapted to cooperate with the sector 41. The vertical arm of bell crank 325 is adapted to cooperate with a latch 327 mounted on gusset plate 287. Latch 327 is normally held in engagement with the vertical arm of the said bell crank by spring 328, but may be disengaged by the action of arm 329, which is fast to a collar on shaft 45 and which is adapted to operate latch 327 by cooperating with a pin 330 on the latter.

With the above described mechanism in mind, let it be assumed that the machine is to go through an accumulating cycle. The mechanism is initially positioned as shown in Figure 3 and, since the pitman 43 is in its mid position, the oscillation of sector 41 is ineffective to move it. As a result, arm 44 remains in the position shown and the totalizer wheels 35 do not engage the racks 32.

When a group or sub total is to be taken, shaft 45 is rocked and arm 329 fast thereto releases latch 327, while a pin 331 on arm 332 likewise fast to shaft 45 strikes finger 333 on latch 285, thus raising 285 and releasing pin 334. Arm 432 is then rotated counterclockwise under tension of spring 335 and pitman 43 is elevated by link 433, so that it will be engaged by rocker arm pin 420 on the return movement of the sector 41. It is to be noted that, although sector 41, at or near its extreme forward position, strikes pin 326 and rotates bell crank 325 clockwise, this is without effect, since latch 327 has been released as described above. Due to the engagement of pin 420 with pitman 43 on the return stroke of the sector 41, the wheels 35 will be engaged with their actuators 32 during the return movement of the latter, and the amounts accumulated on the algebraic units will be transferred to the front totalizer. The positions of the parts after this operation will be those shown in Fig. 17. It will be noted that these positions are identical with those of a simple Powers totalizer after an adding operation, as described hereinabove.

Group total taking is in some instances followed by additional accumulating operations and in other instances by grand total taking operations.

When an accumulating cycle follows a sub total taking operation, neither shaft 45 nor shaft 170 is rocked. Then upon the forward movement of sector 41 (the parts being initially in the position of Fig. 17) the totalizer wheels 35 become disengaged from the actuators 32. Shortly thereafter the sector reaches its forward position and strikes pin 326, which then causes rotation of bell crank 325. Latch 327 being engaged at this time, the bell crank carries the latch with it and causes rotation of gusset plate 287 and sleeve 286. These rotations, however, are limited in extent and serve merely to position pin 334 in front of the notch in latch 285 where it is locked due to tension of spring 336. Then upon return of sector 41 shaft 422 is rocked but ineffectively, since the pitman 43 now lies in its mid position. At the completion of an accumulating cycle the parts again are in the position of Fig. 3.

When a sub total taking cycle is to be followed by a grand total taking cycle, the operation is initiated by rocking shaft 170 (Fig. 17) against the tension of its spring 337. When shaft 170 is rocked, the arm 295 moves the link 288 to rock the gusset plate 287 clockwise, thus lowering the arm 432 and consequently lowering the pitman 43 and disengaging it from upper rocker pin 420, and positioning it so that it will engage with the lower rocker pin 421 just after the sector 41 starts to return to normal position. It is to be noted that, although sector 41 strikes pin 326 and rotates bell crank 325 at about the middle of the grand total taking cycle, this is ineffective since sleeve 286 has already been rotated clockwise to its limit of motion by movement of arm 295 and link 288. As soon as arm 173 is released, spring 337 restores shaft 170 to normal position and permits spring 335 to move arm 432 upwards. Since latch 285 is loose on shaft 170, it will have dropped to its lower position and will block pin 334, thus holding the parts in the position of Fig. 3.

If another accumulating cycle be now initiated, it will be identical to that previously described.

The above described mechanism is set into operation by a rear rock shaft 168 (Figs. 2, 12 and 17) and a forward rock shaft 170 which are connected to rock together but in opposite directions by a link 171 connected at its rear end to an arm 172 depending from shaft 168 and at its forward end to an arm 173 upstanding from shaft 170. In units 4 and 5 the shaft 170 acts in the same manner and by the same means as in the French Patent 719,524, and Belgian Patent 380,- 674, that is to say, it controls the mechanism 42, 43 etc. in such a way as to cause the forward accumulators 35 to take a total and to be cleared.

The shafts 168 and 170 are rocked by the means shown in Fig. 1. Near its left-hand end the shaft 168 has a depending arm 174 which is connected by a link 175 with an arm 176 on a shaft 177, which shaft is journaled in a bracket projecting inward from the frame 2. This shaft has a rearwardly and upwardly inclined arm 178 carrying a stud 180.

Mounted in the same bracket is a second rock shaft 181 having an arm 182 which carries a stud 183. The two studs 180 and 183 are in the same front to rear vertical plane and they are operated alternatively by the link 157 which at its upper end is made T-shaped to provide two shoulders, namely, a shoulder 184 adapted to operate the stud 183 and a shoulder 185 adapted, if the link 157 is swung forwardly from the position shown in Fig. 1, to operate the stud 180. The arm 182 is connected by a link 186 with an arm 187 projecting from the rock shaft 45. The link 157 normally stands, as shown in Fig. 1, in position to operate stud 183 and rock shaft 45 and, therefore, to cause the taking of an ordinary or group total. Means are provided whereby on occasion this link 157 is swung forward until it is free of the stud 183 and engages the stud 180. If in that position the link be operated it will actuate arm 178 and through the train of connections described the rock shafts 168 and 170 and will cause the machine to take a grand total.

The link 157 is controlled as to its forward and back positions and, therefore, as to its taking an ordinary or a grand total, by means which will now be described. At the point in a stack of cards where it is desired to take a grand total a grand total card 188, Fig. 13, having a special control hole 190, is inserted in the stack, this hole being in the 12th position of the first column of the card. In the translator 28 this hole controls a wire 191, Fig. 1, which when elevated is adapted to rock a lever 192, pivoted at 193 on the frame of the translator. This is a lever of the first order and its forward end stands above a slide 194 mounted on the front face of the translator box, and the lower end of this slide stands above an arm 195 projecting rearwardly from a rock shaft 196 and which shaft has a depending arm 197 connected by a link 198 with the link 157. Said link is held by a suitable spring in its rear position shown in Fig. 1, but when the card 188 is in the sensing chamber the wire 191 will be pushed upward and the link will be swung to its forward position. This same card 188 contains a total taking hole 200 which sets into action the operation of the shaft 153 and initiates first a spacing cycle and then a total taking cycle, the latter being characterized by a high point of cam 152 causing the link 157 to be pulled downward and as this link now occupies its forward position it will set the grand total mechanism into operation instead of the group total mechanism.

One of the functions of the shaft 168 (Fig. 2) is to depress the zero stops 68 of the units in which alone grand totals are taken, in this instance, units 4 and 5. To this end back of each of said units said shaft has rigidly mounted thereon an arm 201 which overlies the bail 165 (Fig. 2). When the shaft is rocked counterclockwise in Fig. 2, this arm 201 rocks the bail including the bar 165 and depresses the stops 68. It is for this reason that these bails are made loose on the shaft 162 so that selected ones of them may be operated in this manner independently of the rest. The effect in the present instance is that in a grand total taking operation the total is taken only in units 4 and 5, the zero stops 68 remaining active in all of the other units and preventing any computing or total taking operation therein.

Another function of shaft 168 is to disable the rear accumulator mechanism, in this instance in units 4 and 5, so that the accumulator wheels in these units are out of mesh with their racks during the entire grand total taking cycle so that these wheels never control the racks, nor is the grand total added into them. The mechanism for this purpose is identical with that shown in the French Patent 719,524, and Belgian Patent 380,674. When taking a grand total, the group total shaft 162 is not rocked but the grand total shaft 168 is rocked. The link 316, therefore, continues under the control of the lower bell crank 305 (Figs. 12 and 17), so that this link will be drawn forward and the wheels 88 drawn out of mesh in the first part of the cycle. In order to lock the mechanism in that position throughout the entire cycle a hook 202 is provided adapted to engage a finger 203 of the arm 313 and hold said arm in its forward position with the wheels 88 out of mesh. This hook is in the form of a bell crank pivoted at 204, its upstanding arm having a stud 205 engaging in a slot in the end of a link 206, the stud being normally held in the forward end of a slot by a spring 207. This link is pivoted at its forward end to an arm 208 projecting upward from the grand total rock shaft 168. The construction is such that the link 206 normally holds the hook 202 in its depressed position where it is inactive, but when the shaft 168 is rocked the link 206 is drawn toward the front of the machine stretching the spring 207. As soon as the arm 313 is rocked forward the hook 202 snaps into engagement with it and holds the register wheels out of engagement until the shaft 168 is restored to its normal position, releasing the hook 202.

The means for setting the subtract units or adding and subtracting unit for subtracting an item is similar to that described in the French Patent 719,524, and Belgian Patent 380,674 with only a slight modification. Subtraction may be indicated on the card by perforation in any suitable location not otherwise used. In the present instance the subtract hole 209 (Fig. 13) is located in the 11th position of column 40 on the card and a perforation in that position controls a wire 210 in the translator 28 (Fig. 2) which wire has a branch leading to each of units 6 and 7. This wire when elevated raises a subtraction block 295 which presses upward on a pin 211 to elevate an arm 212 on a rock shaft 213 which rock shaft carries a rearwardly directed arm 214 which at its rear end has a stud 215 projecting into a slot in the lower end of a link 216, which link is pivoted to the hook link 117. The stud 215 is controlled by a spring 217 which holds said stud in the upper end of the slot. The arm 214 is drawn upward by a spring 218 which normally holds the link 117 in its upper or adding position. Whenever the wire 210 is pushed upward due to the presence of a subtract hole in the card the link 214 is swung downward tending to swing the link 117 to its lower or subtracting position. The spring 217 is provided because there is an instant when the link 117 is so strongly held in frictional engagement with the pin 121 that it would be hard for the mechanism to pull it loose. The link swings downward as soon as the arm 114 is rocked forward, relieving the friction.

In the French Patent 719,524, and Belgian Patent 380,674 means are described whereby when a group total is taken the accumulator wheels 88 will automatically be put into mesh with the lower racks 86 in case the total is positive and into engagement with the upper racks 82 in case the total is negative. In the present machine the means for this purpose have been improved. It will be recalled that when the total changes sign "I" is transferred from the wheel of highest to that of the lowest order by means of one or the other of a pair of bails, the left hand arms of which carry latches 95 controlled by the wheel of highest order and the right hand arms of which include the pawls 93 which control the transfer operation of the racks 82 and 86 of lowest order. These right hand arms have extensions 220, the upper one projecting forward and downward, and the lower one, forward and upward, as best shown in Figs. 3 and 15. Each of these arms carries a stud 221 which projects toward the right beyond the plane of the frame plate 75. Pivoted on the outside of said frame plate at 222, Fig. 2, is a controller 223 consisting of a lever the rear arm of which is made with two radial shoulders 224 lying respectively in the path of motion of the studs 221. When the wheels indicate a positive total and when an amount larger than said total is subtracted therefrom the upper device 93 is rocked counterclockwise and the stud 221, striking the upper shoulder 224, rocks the device 223 clockwise to the position shown in Fig. 2, thus indicating that the machine shows a negative total. If now a number be added which is larger than said negative total the lower device 93 will be rocked clockwise and its studs 221 will rock the device 223 counterclockwise until its upper shoulder 224 is approximately in contact with the upper stud 221. This device 223, therefore, is capable of occupying two positions, namely, a position (shown in Figs. 2, 4, and 7) which indicates that the machine shows a negative total and another position (shown in Figs. 5, 6, and 8) which indicates that the machine shows a positive total. This device is yieldingly retained in either of these two positions by a detent 225 pivoted to the frame plate 75 and having a V shaped nose adapted to engage one or the other of two V shaped notches 226 in the edge of the part 223, said latch being controlled by a spring 227.

Since the spring 218 normally holds the mechanism set for addition, totals will be taken from the lower or adding racks 86 unless the automatic mechanism intervenes to reverse the position of the link 117. The means for controlling this link from the device 223 comprises a link 228 (Figs. 2, 4, 5, 6, 7 and 8) pivoted at its lower end to the arm 214, and at its upper end having a slot 230 through which projects a headed stud 231 riveted into a depending arm of the controller 223. The slot 230 permits the link 228 to be depressed to rock the arm 214 downward to set the mechanism for subtraction. The stud 231 being below the pivot 222 of said controller will occupy a forward position when the controller is in its negative position shown in Figs. 2, 4 and 7 and a rear position when said controller is in its positive position shown in Figs. 5, 6 and 8; and the link 228 will swing accordingly. This link carries near its upper end, a stud 232 which, in the negative position of the parts, lies under the rear end of an arm 233 fast on a rock shaft 234 which rock shaft extends across the machine being pivoted in sheet metal brackets projecting rearward from the frame bar 73. Means are provided to rock the shaft 234 clockwise at a suitable time when taking a group total. It will be perceived that under these conditions the link 228 will be depressed by such rocking of the shaft 234 in case the wheels indicate a negative total, but when the wheels indicate a positive total the stud 232 will occupy its rear position out of the path of the arm 233, and the link 228 will not be depressed and the total will, therefore, be taken from the wheels 88 by the positive racks 86 rather than by the negative racks 82.

The total taking mechanism automatically causes the machine to have an idle or spacing cycle preceding the total taking cycle and it is desirable that the computing mechanism be set to the correct sign during the spacing cycle. This is accomplished by placing, on the total shaft 153, a cam 235 (Figs. 1A and 18) which controls a follower roller 236 on a bell crank 237, pivoted to the frame work of the base, said lever controlled by a spring 238. The bell crank 237 is connected by a link 240 to an angled lever 241, pivoted on the stationary frame work, and said lever is connected by a link 242 to an arm 243 projecting from the rock shaft 234. The cam 235 is a concentric disc having in it three depressions, the roller 236 normally lying in one of said depressions, the shaft 234 consequently occupies its normal position. When the drive pawl 291 gives the shaft 153 its first step of motion to set the machine for a spacing cycle, the roller 236 runs on to a high part of the cam rocking the shaft 234, and in case of a negative total depressing the link 228 and setting the mechanism for subtraction. On the second actuation of the total shaft 153 the roller 236 remains on a high part of the cam and continues the setting of this total taking cycle.

The mechanism just described is not only more positive in its action than that described in the French Patent 719,524, and Belgian Patent 380,674 but it is also adapted for use in connection with the base described in the Patent No. 2,044,119 in which group totals may be taken automatically on a change of designation. In the Lasker and Ruiz case (French Patent 719,524, and Belgian Patent 380,674) the means for automatically causing the total to be taken from the correct rack are controlled by perforations in the space and total cards.

*Positive and negative balancing mechanism*

The automatic mechanism just above described is also used to control the printing of a special designation to indicate a negative total or credit balance. The controller 223 has a forwardly projecting arm 244 terminating in a hook which hook occupies an upper position shown in Fig. 2 when the totalizer indicates a negative total and a lower position shown in Fig. 8, when the totalizer shows a positive total. When this hook is in its upper, or negative position, it stands in the path of a stud 245 projecting from the side of a link 246 which, at its forward end, is pivoted to the printing sector 31 standing at the right-hand side of the amount sector of lowest order and whose types 36 are used for printing designating characters. The rear part of the link 246 has an elongated slot which is guided on a shoulder and head screw 247 fastened to the frame plate 75. This sector is automatically released at total taking operations in much the same manner as was described for a similar device in the French Patent 719,524, and Belgian Patent 380,674, and in the case of taking a negative total the stud 230 and the special type sector 31 will be arrested at the position to print a minus sign or other suitable designation.

The machine, as thus far described, can be set up many ways to do different classes of work. A subtracting unit (algebraic totalizer) or a special adding unit (see Fig. 1) may be attached to any desired one of the seven tabulating units of the machine according to the particular need of a specific accounting problem. The wires in the translator 28 can be modified in their arrangement in many ways, special control wires being provided in various places and for various purposes.

The machine is shown in the drawings equipped for tabulating; among other things, a succession of transactions including debit and credit items in a form which is adapted to a certain widely used system of accounting. According to this system of accounting it is desired to produce by the machine a record sheet such as that fragmentarily illustrated in Fig. 10. Any desired matter may be recorded by units 1, 2 and 3 and any one of these three fields may be utilized as a designation field. The cards will have been sorted in such a way that those of like designation are all together. It may be desired to take group totals either on a change of designation, or by the insertion of space and total cards in the card stack. In this particular set up the debit and credit items are punched in the same field at or toward the right-hand end of the card. It is desired that all debit items be accumulated and printed in unit 4, and all credit items in unit 5, and that on a change of designation the totals of the debit and credit items be printed. At the same time that these group totals are printed, it is desired also that the balance be printed. If the balance happens to be a debit balance, it is to be printed in column 6, and if it happens to be a credit balance, it is to be printed in column 7. At the end of the run, it is desired that the grand total of all debit items be printed in column 4 and the grand total of all credit items be printed in column 5.

In order to bring about these results the machine is equipped with subtraction units like those shown in Figs. 2 and 3 in units 6 and 7 and with the special rear accumulator mechanism shown in Fig. 1 in each of columns 4 and 5. The cards used in this set up are illustrated in Fig. 13 including debit cards, credit cards, total cards and grand total cards. The debit and credit items in this particular set up are punched in the right-hand field of the card (the left-hand end as viewed in Fig. 13) and any other desired data can be punched in the other fields of the card. The control holes may, of course, be punched in various positions as found convenient. In the particular instance illustrated the debit cards have a hole 250 punched in the eleventh position in the forty-first column, the credit cards in hole 209 in the eleventh position in the fortieth column. The total cards are punched as usual for this machine, namely, with a hole 200 in the twelfth position of the forty-fifth column. The grand total cards contain the same total hole and also a grand total hole 190 in the twelfth position of the first column. The debit wire 254, Fig. 11, in the translator box is adapted to be controlled by the debit perforation 250 and the credit wire 210 by the credit perforation 209. The grand total wire 191, Fig. 1, is, of course, controlled by the hole 190. A hole 200 in the twelfth position of the forty-fifth column, as has been explained above, operates the automatic total taking mechanism.

Each of the amount wires 30 in the last field of the card is made as a Y wire having four branches as indicated in Fig. 11, one branch of each wire going to the appropriate stops in units 4, 5, 6, and 7 respectively.

The credit wire 210 has three branches, one to the control block of unit 4 and one to each of the units 6 and 7 where they set these latter units for subtraction.

The third branch of credit wire 210 which goes into unit 4 controls a zero blockout device 255 of ordinary construction indicated diagrammatically in Fig. 11, and more in detail in Figs. 14 and 16. Mounted beneath each of the zero stops 68 is a sliding piece 256 the length of which is insufficient to fill the space between the upper end of the zero wire 30 and the lower end of the zero stop 68 except when said wire 30 is in its upper position or the stop 68 is depressed. The block or bar 255 lies transversely of each computing unit so equipped beneath these slides 256. When the wire 210 is raised under the control of a credit card it raises the bar 255 and thus prevents downward motion of the slides 256 and hence prevents downward motion of all of zero stops 68 of that unit, the pins 67 in that case moving idly in the vertical slots in stops 68 and stretching springs 70. The construction is such, therefore, that when a credit card is being tabulated the fourth or debit unit is blocked out of operation entirely, this item being neither printed nor accumulated in that unit.

Each debit card designated by a hole 250 controls another wire 254 which operates a similar blockout device 257, Fig. 11, which prevents operation of the credit unit 5 when a debit item is being accumulated.

The whole construction is such that debit items are added in the 4th, 6th and 7th units and are not recorded in the 5th unit, and that credit items are added in the 5th unit and not in the 4th unit, and such items are subtracted in the 6th and 7th units. It will be perceived that the 6th and 7th units are always operated alike so that at the end of a group of cards both these units show the same balance.

The machine could be arranged so as to omit one of the balance units 6 and 7 and so that the balance would always be printed in, say, unit 6 and credit balances would be designated by a minus sign as explained in Belgian Patent 380,674. Such a machine would take care of the form of bookkeeping under consideration but the customer's requirement is that debit balances be printed in column 6, and credit balances in column 7. It is for this reason that in the present case two balance units are provided.

In order to cause debit balances to be printed in column 6 and credit balances in column 7, two hammer locks are provided as indicated diagrammatically in Fig. 11, namely, a hammer lock 258 for unit 6 and a hammer lock 260 for unit 7, these hammer locks being normally active so that items are not printed in these two units. Automatic means are provided so that when taking a group total if the balance happens to be a debit balance the hammer lock 258 will be disabled to allow the balance to be printed in column 6 but the hammer lock 260 will remain active and prevent the balance being printed in column 7; and vice versa, if the balance is a credit balance, the hammer lock 260 will be disabled allowing the balance to be printed in column 7 and not in column 6. Both balance accumulators will, however, be cleared ready for the computation of the next group of items.

*Hammer control*

The hammer locks employed are of the sort commonly used in the Powers machine and shown in locking position in Fig. 2 and in disabled or unlocking position in Figs. 6 and 9. Each hammer 37 has on its forward end a hooklike projection 261 by which the hammer is normally held down by the mechanism 38. The hammer lock comprises a bail bar 262 extending across the width of a single unit and having at each end arms 263 pivoted on a frame rod 264. One of the arms 263 is extended backward and is controlled by a link 265 by which the bail can be swung to the upper or locking position shown in Fig. 2, and to a lower or unlocking position shown in Figs. 6 and 9. When the bail is in its upper position the bar 262 stands in the paths of the hooks 261 and prevents the hammers striking the types, whereas when the bar is in its lower position it is out of the paths of said hooks and allows the hammers to print.

In the present set-up these hammer locks are controlled from the devices 223, one in unit 6, and the other in unit 7.

The means for controlling the hammer lock 258 for unit 6 is shown in Figs. 4, 5, and 6. Adjacent the arm 233 on the rock shaft 234 there is loosely pivoted on said shaft a lever 266 to which is pivoted the rear end of a link 267 which at its forward end is pivoted to the upright arm of a bell crank 268 pivoted on a rod 270 and whose horizontal arm is pivoted to the link 265 which controls the hammer lock. A pin 271 projecting from the arm 233 supports one end of a spring 272 whose other end is connected to a pin projecting from the device or lever 266, and a shoulder of said device contacting with the pin 271 limits the motion of said device relative to the arm 233. At its upper part the device 266 has a rearwardly projecting arm 273 which cooperates with a pin 274 projecting from the control piece 223. The construction is such that when in the taking of a group total the shaft 234 is rocked, the device 266 tends to move with it and if it does move with it this device acting through link 267, bell crank 268 and link 265, will move the hammer lock to its inactive position and permit the printing of the balance in column 6 as shown in Fig. 6. In this figure the controller 223 stands in the position that it occupies when the accumulator shows a positive balance, and in that position the pin 274 stands below the path of the arm 273. When, however, as shown in Fig. 4 the device 223 stands in the position to indicate a negative balance, the pin 274 stands in the path of the arm 273 preventing rocking of the lever 266. If now a group total be taken and the shaft 234 be rocked, the device 266 will be arrested by the pin 274 and the arm 233 will merely stretch the spring 272 without releasing the hammer lock, so that a credit balance will not be printed in column 6.

The devices controlling the hammer lock 260, in units 7, are shown in Figs. 7, 8, and 9. In this instance, there is also pivoted on the shaft 234 a device 275 controlled by a pin 271 and spring 272, the same as the device 266, and this device 275 has pivoted thereto a link 276 connected by a bell crank 277 with a link 265 controlling the hammer lock bail bar 260 in the same manner as above described in column 6. In this instance the controller 223 carries a pin 281 which cooperates with a stop arm 282 on the device 275. In Figs. 7 and 9 the controller 223 is in the position indicating a credit balance and the pin 281, therefore, stands above the end of the arm 282 so that when shaft 234 is rocked in the taking of a group total the device 275 will rock with it and release the hammer lock as shown in Fig. 9. When, however, the controller 223 stands in the position indicating a debit balance, as shown in Fig. 8, the pin 281 stands in the path of the arm 282 and prevents the release of the hammer lock. The whole construction is such that in unit 7 credit balances will be printed and debit balances will not be printed. As said above the hammer lock does not prevent the clearing of the accumulator so that at each group total the accumulators are cleared in both units 6 and 7, but if the balance is a debit balance it will be printed only in unit 6, and if it is a credit balance it will be printed only in unit 7.

*Grand total mechanism*

The computing units 6 and 7 may, of course, be equipped with forward accumulators 35; but as these are not needed in the particular set-up described they have been omitted.

The means for preserving and printing grand totals in units 4 and 5 are identical with those described in French Patent 719,524, November 23, 1931 and Belgian Patent 380,674, June 18, 1931, except as hereinbefore described. Much of the mechanism employed for this purpose has been omitted in the drawings, it being old and well known.

It is believed that the operation of the machine will be understood from the foregoing description and the following summary of the operation. The cards 6 having been previously punched according to the system described and having been sorted in groups according to the designations in some suitable field of the card, are placed in the magazine 5 with a total card followed by a grand total card inserted or added wherever a grand total is required. The cards will be fed through the machine, the debit items whose cards are designated by the hole 250 being accumulated and printed in unit 4, blocked out of unit 5 and added but not printed in units 6 and 7; while credit items whose cards are designated by holes 209 will be added in unit 5, blocked out in unit 4 and subtracted but not printed in units 6 and 7.

Interponents 149 having been suitably set, on each change of designation, the automatic totaltaking mechanism including said interponents will be set into operation, temporarily stopping the feed of cards and retaining in the sensing chamber the first card of the new group. The shaft 153 will be brought into action performing the functions just described and causing the machine to make first a spacing cycle and then to operate the follower 155 to pull down links 157 and 186 and thus to bring about a total taking cycle. After this the third step of the shaft 153 will restore the parts to normal condition and the machine will proceed to tabulate the next group of cards.

In the group total taking operation all seven of the units if they are all in use, will print their totals. In the case of units 1, 2, and 3 these totals will be taken from the ordinary accumulators 35 and in the case of the remaining units from the rear accumulators. These rear accumulators in units 6 and 7 will both show the same identical balance which may be either positive or negative. In case it is positive both controllers 223 will occupy their positive positions shown respectively in Figs. 5 and 8. In this event the mechanism shown in Fig. 6 will permit the release of the hammer lock mechanism 258 of unit 6, so that the balance will be printed in that column. In this event also the positive position of the controller 223 in unit 7 will prevent the release of the hammer lock mechanism 260 and prevent the printing of the balance in that column.

In case the balance is negative both controllers 223 will occupy their negative positions shown respectively in Figs. 4 and 7. In this position the hammer lock mechanism 258 in column 6 will not be released and the mechanism 260 in column 7 will be released and the credit balance will be printed in column 7 only.

When the group totals are taken they will be printed in columns 4 and 5 from the rear accumulators shown in Fig. 1 and they will be transferred to the forward accumulators in those units by the mechanism described in the French Patent 719,524, and Belgian Patent 380,674.

After the printing of the last item from the last group of cards the total card will be fed into the sensing chamber. This card will automatically cause the taking of the last group total. This will be followed by the grand total card which will simultaneously set into operation the function controlling mechanism including the shaft 153, and cause the link 157 to be shifted into connection with the settable grand total mechanism, so that the grand totals will be printed and the grand total accumulators cleared.

Although there has been described above a highly desirable embodiment of the invention, it is obvious that many changes in form could be made without departing from the spirit of the invention and I, therefore, do not limit myself to the exact form herein shown and described, nor to anything less than the whole of my invention as hereinbefore set forth, and as hereinafter claimed.

What I claim as new and desire to secure by Letters Patent is:

1. The combination of card sensing means, printing means, a group accumulator adapted to accumulate both positive and negative items, a grand total accumulator, operating mechanism, mechanism settable to cause said operating mechanism to print a group total of proper algebraic sign, mechanism settable to cause the operating mechanism to print a grand total, mechanism brought into operation under card control for controlling the functions of the machine necessary to the taking of all totals, and card controlled means for shifting the connections from said controlling mechanism from one of said settable mechanisms to the other, whereby, under card control the machine will at one time automatically take a group total and at another time a grand total.

2. The combination of card sensing mechanism, printing mechanism, a group accumulator adapted to accumulate both positive and negative items, a grand total accumulator, operating mechanism, mechanism settable to cause the printing of a group total of proper algebraic sign, mechanism settable to cause the printing of a grand total, mechanism brought into operation under card control for controlling the functions of the machine necessary to the taking of all totals, connections from said controlling mechanism to said settable mechanisms, including a link, and means whereby said link is shifted under card control to connect said controlling mechanism with one or the other of said settable mechanisms.

3. The combination of card sensing mechanism, printing mechanism, a group accumulator adapted to accumulate both positive and negative items, a grand total accumulator, operating mechanism, mechanism settable to cause the printing of a group total of proper algebraic sign, mechanism settable to cause the printing of a grand total, mechanism operable under card control for controlling the functions of the machine throughout a plurality of cycles for the purpose of taking all totals, and card controlled means for connecting said controlling mechanism at one time with said settable mechanism for group totals and at another time to said settable mechanism for grand totals.

4. The combination of card sensing mechanism, algebraic accumulating mechanism controlled by said sensing mechanism, printing mechanism, total taking mechanism including means for automatically bringing about first a spacing operation and then a total taking operation of the machine, and additional means controlled by the state of said accumulating mechanism and acting during the spacing and total taking operations for positively setting the total taking mechanism for a negative operation in case the accumulating mechanism registers a negative total.

5. A card controlled tabulating machine for tabulating debit and credit items and debit and credit balances, comprising in combination card sensing mechanism; printing and computing mechanism arranged to compute and print in a plurality of columns including debit computing and printing mechanism, credit computing and printing mechanism and two balance computing and printing mechanisms; connections from said sensing mechanism to said computing and printing mechanisms including branched connections from a single field of the card to all four of the printing and computing mechanisms; means whereby a control hole in the card will cause a debit item to be added and printed in the debit column and to be added in both the debit balance and credit balance columns but not in the credit column; means whereby a control hole designating a credit item will cause said item to be printed and added only in the credit column and subtracted both in the debit balance and credit balance columns; whereby all debit items will be printed and accumulated in the debit column and all credit items will be accumulated and printed in the credit column, and whereby identical balances will be computed in the debit balance and credit balance columns; group total taking mechanism to cause the clearing of the computing mechanism in all four columns; means controlled by the accumulator in the debit balance column to cause printing of the total in that column and not in the credit balance column in case the total is positive; and means controlled by the state of the accumulator in the credit balance column to cause the printing of the total in that column and not in the debit balance column in case the total is negative.

6. A card controlled tabulating machine for tabulating debit and credit items and debit and credit balances comprising in combination, card sensing mechanism; printing and computing mechanism arranged to compute and print in a plurality of columns including debit computing and printing mechanism, credit computing and printing mechanism, and two balance computing and printing mechanisms; connections from said sensing mechanism to said computing and printing mechanisms including branched connections from a single field of the card to all four of the printing and computing mechanisms; means whereby a control hole in the card will cause a debit item to be added and printed in the debit column and in both the debit balance and credit balance columns but not in the credit column; means whereby a control hole designating a credit item will cause said item to be printed and added only in the credit column and subtracted both in the debit balance and credit balance columns; whereby all debit items will be printed and accumulated in the debit column and all credit items will be accumulated and printed in the credit column, and whereby identical balances will be computed in the debit balance and credit balance columns; group-total taking mechanism to cause the clearing of the computing mechanism in all four columns; and means acting automatically in case the identical balance accumulated in the two balance columns is negative to prevent said balance from being printed in the debit balance column and in case said balance is positive to prevent its being printed in the credit balance column.

7. The combination of a debit adding and printing unit, a credit adding and printing unit, a debit balance adding and printing unit, a credit balance adding and printing unit, means for controlling all four of said units from a single field of a perforated card so that the two balancing units compute identical balances, card controlled means for causing debit items to be accumulated only in the debit unit and credit items only in the credit unit, printing-hammer locks, one in each of the two balance units, said locks normally active to prevent printing, total taking mechanism, and means acting automatically to release the hammer lock of the debit balance unit in case the balance is positive, and to release the credit balance hammer lock in case the balance is negative.

8. In a machine of the class described, the combination with the differentially movable devices of a computing unit, of a stop basket comprising in each denomination a series of settable number stops and a zero stop, levers connected with said zero stop and controlled by springs holding said zero stops normally in active position and said levers yieldingly connected with said zero stops for withdrawing the latter from active position, and means whereby any of said number stops rocks the lever associated with that denomination to withdraw its zero stop; and means for rocking all of the said levers to withdraw all of the zero stops.

9. In a machine of the class described, the combination with the differentially movable devices of a computing unit, of a stop basket comprising in each denomination a series of figure stops, a zero stop, a lever having yielding connection with said zero stop for retracting the latter from active position, a spring acting on said lever to hold said zero stop normally in active position, means whereby any figure stop may rock the zero stop retracting lever of its denomination; and total taking mechanism including a device universal to the levers of a computing unit for rocking all of said levers to withdraw all of the zero stops.

10. In a machine of the class described, the combination with the differentially movable devices of a computing unit, of a stop basket comprising in each denomination a series of figure stops, a zero stop, a lever having yielding connection with said zero stop for withdrawing the latter from active position, a spring acting on said lever to hold said zero stop normally in active position, and means whereby any figure stop may rock the lever of its denomination; total taking mechanism including a universal device for rocking all of said levers to withdraw all of the zero stops, and means operable upon occasion to block the withdrawal of said zero stops whereby said levers when rocked by said total taking mechanism will be rocked idly against said yielding means and the zero stops will remain in active position.

11. In a card controlled tabulating machine, the combination of algebraic totalizers which automatically accumulate true positive and negative totals; printing mechanism; a lever associated with each set of totalizers; means for setting said lever according to the sign of the amount standing in its associated totalizer; means governed by each of said levers for setting a bail to restrain said printing mechanism; and automatic means whereby only one of said print restraining bails will be effective.

12. The combination of card sensing mechanism, printing mechanism, a group total accumulator, a grand total accumulator, operating mechanism, mechanism settable to cause the group total accumulator to be cleared and its total printed, mechanism settable to cause the grand total accumulator to clear and its total printed, mechanism brought into operation under card control for controlling the functions necessary to the clearing of all total accumulators and the printing of their totals, a connection from said controlling mechanism to said settable mechanism including a pivoted member, and means whereby said pivoted member is shifted under card control to connect said controlling mechanism with one or another of said settable mechanisms.

13. The combination of printing mechanism including a type carrier for printing special characters, algebraic accumulating mechanism, a pivoted member automatically set to one position when said accumulating mechanism registers a positive total and to another position when said accumulating mechanism registers a negative total, and a stop on said pivoted member for causing the arrest of said special type carrier to print a special sign to designate the sign of a total.

WILLIAM W. LASKER.